United States Patent [19]
Brooks et al.

[11] Patent Number: 5,540,244
[45] Date of Patent: Jul. 30, 1996

[54] METHOD AND APPARATUS FOR CLEANING AND RECYCLING POST-CONSUMER PLASTIC FILMS

[75] Inventors: J. Douglas Brooks, Springdale, Ak.; Joe G. Brooks, Junction, Tex.; Joyce H. Rose, Rogers, Ak.; Steve W. Pierce, The Woodlands, Tex.

[73] Assignee: Advanced Environmental Recycling Technologies, Inc., Springdale, Ak.

[21] Appl. No.: 171,509

[22] Filed: Dec. 22, 1993

Related U.S. Application Data

[63] Continuation-in-part of Ser. No. 163,183, Dec. 7, 1993, abandoned.

[51] Int. Cl.6 .................................................. B08B 13/00
[52] U.S. Cl. ..................... 134/56 R; 134/111; 134/131; 134/68
[58] Field of Search ................................ 134/61, 62, 68, 134/131, 111, 56 R, 57 R, 58 R; 68/12.02, 9; 162/252

[56] References Cited

U.S. PATENT DOCUMENTS

| | | | |
|---|---|---|---|
| 2,737,435 | 6/1956 | Borck | 8/156 |
| 3,226,343 | 12/1965 | Rhodes | 260/2.3 |
| 3,284,282 | 11/1966 | Immel | 162/4 |
| 3,843,060 | 10/1974 | Colburn | 241/24 |
| 4,000,031 | 12/1976 | Acobas | 162/4 |
| 4,076,579 | 2/1978 | Brink | 8/156 |
| 4,092,458 | 6/1978 | Hoffman | 428/402 |
| 4,123,489 | 10/1978 | Kelley | 264/141 |
| 4,134,554 | 1/1979 | Morlock | 241/35 |
| 4,138,313 | 2/1979 | Hillstrom et al. | 8/156 |
| 4,160,722 | 7/1979 | Marsh | 209/4 |
| 4,162,768 | 7/1979 | Froats | 241/45 |
| 4,332,748 | 6/1982 | Fremont | 264/11 |
| 4,436,104 | 3/1984 | Kashiwagi | 134/63 |
| 4,751,030 | 6/1988 | Volk, Jr. | 264/40.6 |
| 5,007,620 | 4/1991 | Emmett, Jr. et al. | |
| 5,048,139 | 9/1991 | Mazsumi et al. | 68/12.02 |
| 5,084,135 | 1/1992 | Brooks et al. | 162/4 |
| 5,259,219 | 11/1993 | Dausch et al. | 68/12.02 |

FOREIGN PATENT DOCUMENTS

| | | |
|---|---|---|
| 695881 | 10/1964 | Canada . |
| 3002061 | 1/1980 | Germany . |
| 1228276 | 4/1971 | United Kingdom . |

OTHER PUBLICATIONS

"The Process and Economics of Polymer Coated Wood Fiber Recovery", A. J. Felton, reprinted from *TAPPI. The Journal of the Technical Association of the Pulp and Paper Industry*, vol. 58, No. 5, May 1975.

*Primary Examiner*—Frankie L. Stinson
*Attorney, Agent, or Firm*—Ross, Clapp, Korn & Montgomery, LLP

[57] ABSTRACT

A system and method for removing fine cellulosic contaminants from plastic film utilizing a plurality of tanks, means for moving the plastic film sequentially through the tanks, means for recirculating an aqueous solution through each of the tanks, means for filtering the recirculating aqueous solution, and means for injecting flocculant into the recirculating solution. The subject system preferably includes at least two independent circulation modules, each having means for recirculating and filtering an aqueous solution and for minimizing liquid carry-over from one module to another. The system also preferably includes means for monitoring the turbidity of the recirculating aqueous solution and for injecting flocculant into the recirculating solution whenever the turbidity exceeds a predetermined maximum value.

7 Claims, 10 Drawing Sheets

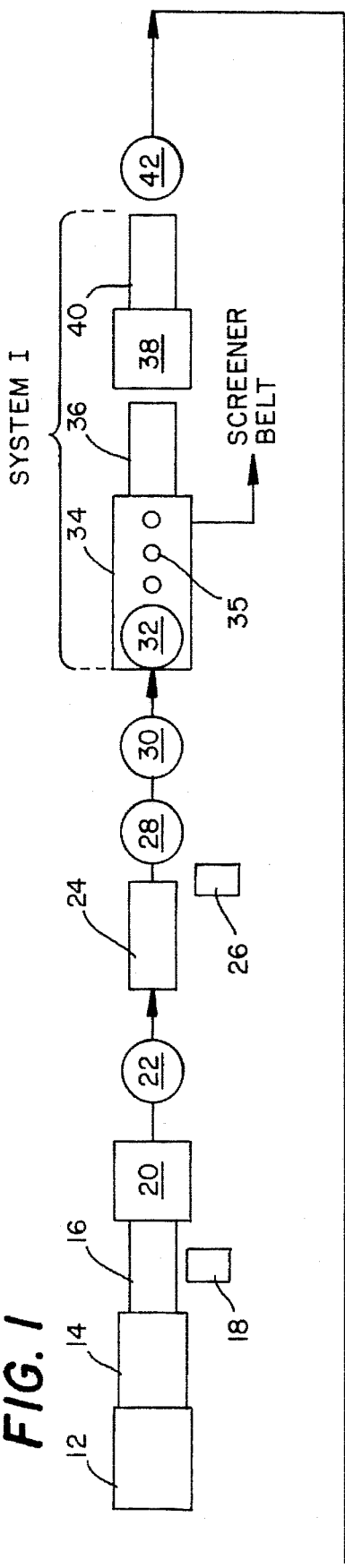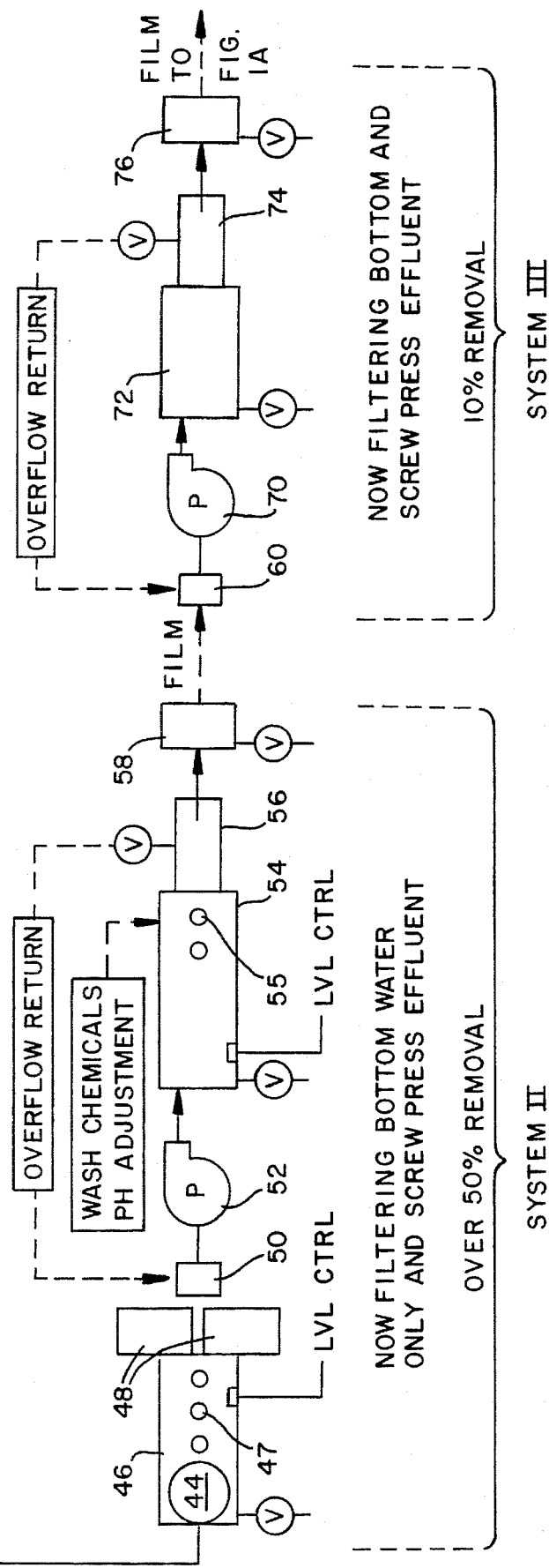
FIG.1

FIG. 8
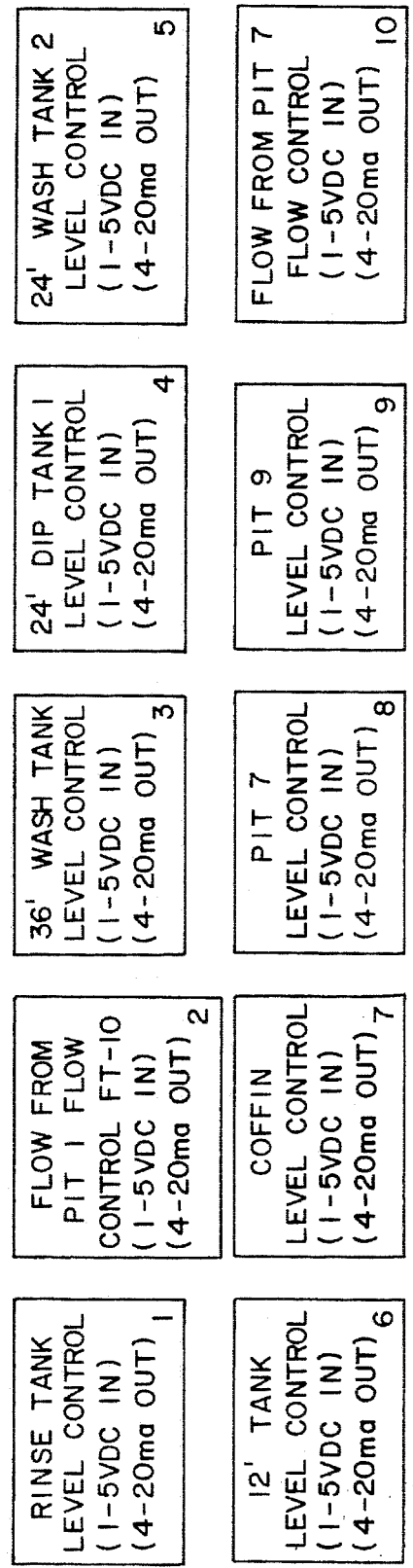
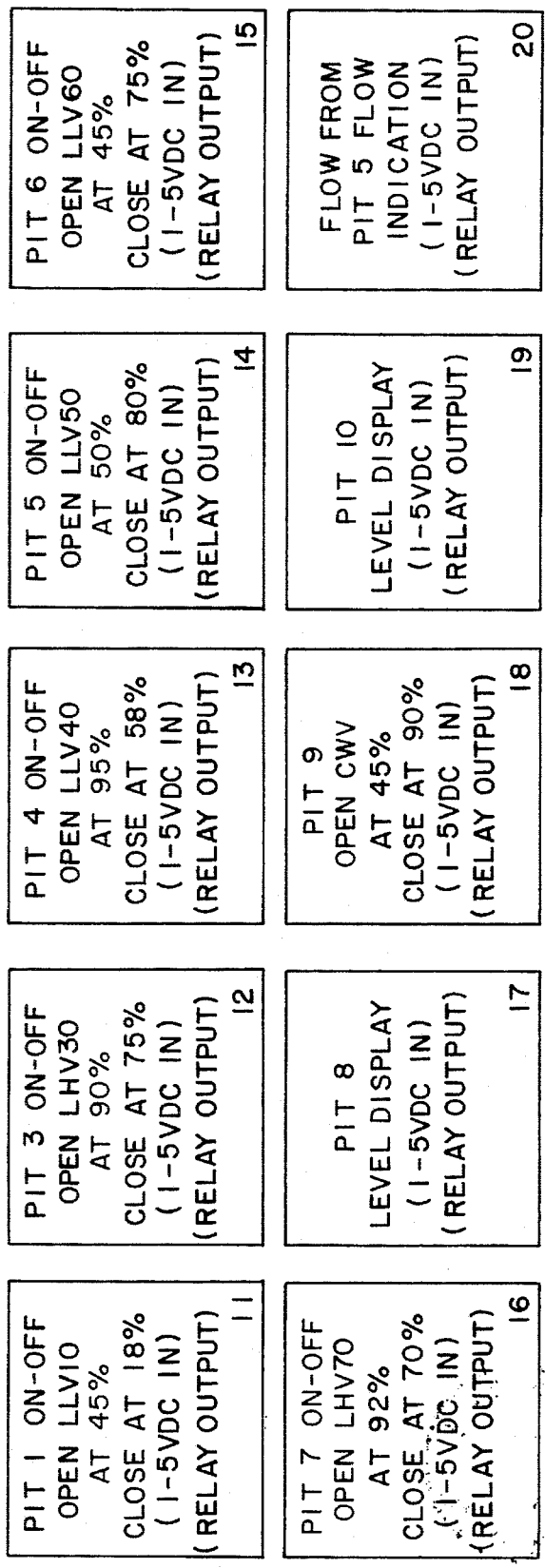

METHOD AND APPARATUS FOR CLEANING AND RECYCLING POST-CONSUMER PLASTIC FILMS

CROSS-REFERENCE TO RELATED APPLICATION

This application is a continuation-in-part of application Ser. No. 08/163,183, filed Dec. 7, 1993 now abandoned.

BACKGROUND OF THE INVENTION

1. Field of the Invention

This invention relates to a method and apparatus useful in the reclamation of post-consumer plastic films and more particularly to the cleaning and recycling of grocery bags, trash bags, plastic liners and industrial stretch films.

2. Description of Related Art

Plastic recycling has increased significantly in recent years, especially the recycling of plastic containers made, for example, of high density polyethylene (HDPE) or polyethylene terephthalate (PET). HDPE has been increasingly recycled back into rigid containers and into many injection molding applications. Recycling post-consumer plastic materials back into film is especially difficult, however, due to the purity required to produce acceptable quality and performance.

Because of the widely varying nature and quantity of contaminants present in post-consumer plastics presented for recycling, achieving a consistently acceptable quality level in the resultant reclaimed product is a major challenge, particularly when the objective is also to make the reclaimed plastic economically competitive with virgin material. Thin gauge plastic films (e.g., 2 mils thickness or less) are very difficult to decontaminate during reclamation because of their high surface area to volume ratio and their tendency to shroud, envelop, adhere to or otherwise entrap contaminant materials, especially contaminants such as paper. Thorough and efficient removal of these contaminants is desirable, however, and very important if the reclaimed plastic is to be recycled into plastic film applications.

Methods and apparatus for use in recycling plastic films are disclosed, for example, in U.S. Pat. No. 5,268,074 and application Ser. No. 854,231, filed Mar. 20, 1992, both of which are incorporated by reference herein. A separation tank useful for separating plastic from paper and other contaminants has previously been disclosed in U.S. Pat. No. 5,088,910, also incorporated by reference herein.

Notwithstanding the benefits and advantages achieved through use of the methods and apparatus previously disclosed, methods and apparatus are needed that will further improve the efficiency with which post-consumer plastic film is reclaimed, and the quality of the resultant reclaimed plastic. In particular, there is a continuing need for methods and apparatus useful for decontaminating and processing thin gauge plastic film having incoming contamination levels of cellulosic materials and other waste greater than about 4 percent (frequently 8 to 15 percent and sometimes as high as 30 to 40 percent by weight) into a form suitable for use in film applications wherein the recycled film content is as great as about 50 percent recycled material or higher.

Due to the typically high level of contamination in post-consumer plastic films, dry processes cannot be used successfully for recovering the film. Similarly, wet processes that simply utilize "float and sink" methods do not remove contamination sufficiently to allow the material to be reprocessed at significant percentage levels into thin-gauge films of acceptable quality. Even when the post-consumer film reclaimed by conventional means is extruded and melt filtered through a screen-pack, remaining contaminants frequently show up as gels when the reclaimed material is reprocessed into film.

A need therefore exists for an effective and economical method and apparatus for use in cleaning and recovering highly contaminated thin-gauge plastic film suitable for reprocessing into thin-gauge films having a significant recycle content where high levels of film quality and performance are required.

It has also been determined that additional phenomena can be introduced into the film materials by mechanical processing that make cleaning the film and separating contaminants even more difficult. In particular, it has been determined that the shredding and wet grinding steps used to reduce the size of the film pieces can create a static charge that hinders subsequent separation of the film pieces from fine contaminants, particularly fine paper particles that may be present in film from ground or shredded post-consumer trash or grocery bags. Additional methods and apparatus are therefore needed to remove these adherent contaminants from the film particles so that the resultant recovered product will be of acceptable quality for recycling into thin-gauge film.

SUMMARY OF THE INVENTION

According to one embodiment of the invention, a system is provided for removing fine cellulosic contaminants from plastic film. The system preferably comprises apparatus including a plurality of receptacles, means for moving the plastic film sequentially through the receptacles, means for recirculating an aqueous solution through each of the receptacles, means for filtering the recirculated aqueous solution, and means for injecting flocculant into the recirculating solution. According to one particularly preferred embodiment of the invention, the subject system comprises at least two independent recirculation modules, each having means for recirculating and filtering an aqueous solution, for restricting carry-over of liquid between modules, and for injecting flocculant in response to measured or observed turbidity. According to another particularly preferred embodiment of the invention, means are provided for monitoring the turbidity of the recirculating aqueous solution and for intermittently injecting flocculant into the recirculating solution whenever the turbidity exceeds a predetermined maximum value.

According to another embodiment of the invention, a system is provided for removing cellulosic contaminants from post-consumer plastic film, the system comprising sequentially arranged dip, wash and rinse tanks through which the film is moved, and at least two closed-loop circulation systems by which the aqueous solutions are circulated through the tanks, filtered and recirculated. According to one preferred embodiment of the invention, means are provided for injecting a flocculant and/or a surfactant into the recirculating aqueous solutions. According to one particularly preferred embodiment of the invention, means are provided for injecting a flocculant into a recirculating aqueous solution to control turbidity.

The method of the invention generally involves reducing the size of post-consumer plastic film scrap, usually comprising a major portion of polyethylene, to flakes by shredding and wet grinding, and moving the resultant ground film through a series of separation modules that remove paper and other contaminants from the film. The separation modules preferably comprise tanks with liquid recirculation systems that are desirably self-contained and independently filtered to minimize contaminant carryover into subsequent modules.

One difficulty that has been encountered with the prior art systems utilizing a single liquid recirculation system has been the buildup of turbidity in the recirculating liquid in the form of fine contaminant particles that do not settle out as the film flakes pass through successive tanks. The system and method disclosed herein produce a cleaner product, suitable for reprocessing into film applications, by doing a better job of removing particulate contaminants in each module of the subject system. The use of dewatering belts and/or screw presses for dewatering the film flakes as they move between the sequential modules reduces effluent carryover and associated contaminant carryover, thereby resulting in a cleaner product. Liquid filtration, preferably aided by flocculation, is carried out within the recirculating liquid system of each independent module so that fine contaminants are continually removed within each module and do not build up throughout the system.

According to another embodiment of the invention, a method is provided for removing fine contaminants such as, for example, suspended paper particles, from post-consumer plastic film. The method of the invention preferably o comprises the steps of dipping, washing and rinsing particulate plastic film in receptacles, preferably open tanks, containing a recirculating aqueous solution comprising a flocculant and, optionally, a surfactant. According to a particularly preferred embodiment of the invention, the flocculant is injected into the recirculating aqueous solution intermittently in response to measured or observed turbidity. The carry-over of turbidity into successive tanks is preferably further controlled by segregating the recirculating aqueous solution into independent circulation modules that each comprise means for filtering the solution and for utilizing flocculant to help control turbidity.

According to another embodiment of the invention, a method is provided for use in removing contaminants from thin-gauge plastic film that comprises the steps of providing contaminated post-consumer film, reducing the film to pieces of a size sufficiently small to facilitate thorough wetting of the film pieces when contacted with an aqueous solution, submerging the film pieces in aqueous solutions circulating through each of a plurality of sequentially disposed wetting tanks, the circulating aqueous solutions being subdivided into at least two isolated recirculating systems, subjecting the wetted film both to turbulent and quiescent flows to facilitate separation of the film from cellulosic and other contaminants, and thereafter recovering and drying the film. According to a particularly preferred embodiment of the invention, the recirculating systems preferably each comprise means for introducing a flocculant, surfactant, pH adjusting agent and/or other treating chemicals into the aqueous systems to improve the separation of contaminants from the plastic film and from the recirculating aqueous solutions.

BRIEF DESCRIPTION OF THE DRAWINGS

The apparatus of the invention is further described and explained in relation to the following figures of the drawings wherein:

FIG. 1 and FIG. 1A are simplified process flow diagrams depicting a preferred contaminant removal system for use in reclaiming post-consumer, thin-gauge plastic film;

FIG. 8 is a diagrammatic front elevation view of a control panel for use with the apparatus depicted in FIGS. 1–7;

FIG. 9 is a simplified detail view of a manifold suitable for introducing treatment chemicals into a tank such as the separation tank included in the system of the invention.

DESCRIPTION OF THE PREFERRED EMBODIMENTS

Figure 1A:
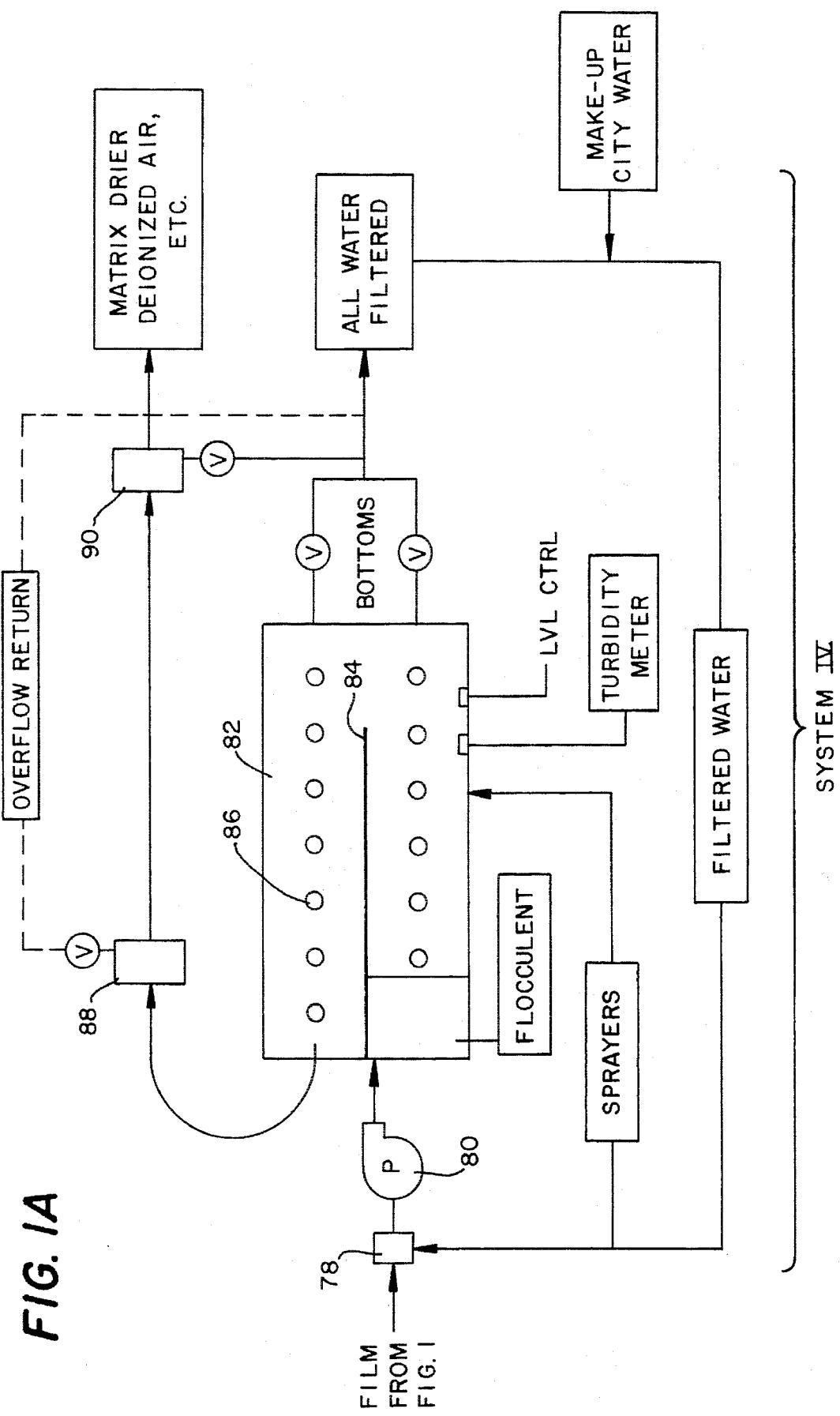

Referring to FIG. 1, a simplified process flow diagram is provided for a preferred contaminant removal system 10 for use in reclaiming post-consumer, thin-gauge plastic film. Such film can include, for example, grocery bags, trash bags, plastic liners and industrial stretch films. System 10 preferably comprises bale table 12 for breaking and pulling apart bales of post-consumer plastic film. If desired, bale table 12 can include a guillotine, rotating bale breaker, or other similarly effective means for pulling bales of plastic apart and stringing out the previously compressed layers of film and interspersed contaminants. On sorting table 14, gross contaminants such as tramp wood, metal, rock, glass, other foreign objects, etc. are desirably removed before the plastic film enters shredder 20. If desired, a shaker table can also be utilized to assist in removing contaminants from the film at this point. The film preferably travels from sorting table 14 to shredder 20 along conveyor 16, which is desirably provided with means such as electromagnet 18 for removing any remaining chunks of ferrous metal that might damage the teeth of shredder 20. Water is preferably sprayed into shredder 20 for cooling.

Particulate plastic film discharged from shredder 20 is preferably blown by fan 22 through rotating trommel screen 24 having a mesh size selected to enhance the separation of the shredded plastic film from heavier contaminants. Drum magnet 26 desirably provides further removal of small ferrous metal particles as the film pieces are discharged into tub grinder 28. One function of tub grinder 28 is to pull wads and clumps of plastic film apart to loosen other still-trapped contaminants. The shredded film entering tub grinder 28 is preferably sprayed lightly with water because shredded paper particles intermixed with and/or clinging to the film tends to ball up into small wads in the tub grinder, thereby further facilitating separation.

From tub grinder 28, the shredded film is blown by fan 30 into cyclone 32, which removes additional fine contaminants before discharging the film pieces into dip (prewash) tank 34. According to one embodiment of the invention, dip tank 34 has a surface area of about 360 ft.$^2$ for a throughput rate of about 4000 pounds of film per hour. Dip tank 34 is preferably equipped with rotating dunking cylinders or paddle wheels adapted to submerge the film in a recirculating aqueous solution that is discussed in greater detail below. As the plastic film is submerged in dip tank 34, rock, metal, glass and other contaminant particles sink toward the bottom. Also, paper particles still intermixed with or adhering to the film pieces absorb water, making them heavier than the plastic film and causing them to begin settling or sinking within the aqueous solution. Dip tank 34 preferably comprises a substantially rectangular tank with a lower portion having wall sections (e.g., either planar or conical) inclined at an angle greater than about 45°, and most preferably from about 60° to about 80° from horizontal, that direct saturated paper settling within the tank toward a plurality of takeout ports 35 disposed in the tank bottom. According to one preferred embodiment of the invention, agitation at the top of dip tank 34 is controlled so as to maintain a more quiescent zone of relatively laminar flow in the bottom half of the tank to promote settling. A preferred residence time for plastic particles passing through dip tank 34 is about 10 seconds where the circulation rate of aqueous liquid through the tank ranges from about 300 to about 400 gallons per minute. A preferred pH for the water circulated through dip tank 34 ranges from about 6.3 to about 7, although a higher pH of from about 9 to about 11 may be preferred where the material being processed contains a significant amount of inks (typically soy-based). The appearance and odor of the liquid in dip tank 34 are preferably monitored. Where the plastic film is contaminated with organic waste, slime and grease may accumulate at the surface, and the addition of a conventional oxidant such as hydrogen peroxide or an antimicrobial agent such as acetic acid may be desirable.

Plastic film pieces floating at or near the surface of dip tank 34 are preferably collected on dewatering belt 36 and conveyed into the feed port of another shredder 38. After shredder 38, the pieces of plastic film are further dewatered on dewatering belt 40, or alternatively in a dewatering auger, and then collected and blown by fan 42 into cyclone 44 where fine particulate matter, mostly cellulose fibers, is again removed.

From cyclone 44, the film pieces are discharged into a second dip tank 46 constructed similarly to dip tank 34 described above wherein the film is again submerged in a recirculating aqueous solution to facilitate wetting and subsequent settling and separation of intermixed paper particles through collection ports 47 at the tank bottom. The plastic film pieces floating at or near the surface are carried over a weir by the recirculating solution and into the inlet port of a wet granulator 48 that further comminutes the plastic film into small flakes having a particle size suitable for pelletizing or such other downstream processing as may be desired.

According to a preferred embodiment of system 10 of the invention, the film flakes and water are discharged from wet granulator 48 into catch basin 50 and then slurried by pump 52 to an inlet beneath the surface of the recirculating aqueous solution in wash tank 54, where a subsurface baffle directs the film flakes toward the surface. Wash tank 54 is also desirably constructed with a lower portion having inclined walls for directing settled paper and/or other contaminants to a plurality of take-out ports. As the film flakes move along the length of wash tank 54 at or near the surface, rotating paddle wheels or similar conventional means can be used to push the plastic along and to periodically submerge floating material to promote wetting and separation, although such means will desirably not introduce significant turbulence into the lower region of the tank. If desired, additional baffles can be disposed inside the tank to promote laminar flow and settling in the lower portion of the tank. At the distal end of wash tank 54, the flakes of film are preferably picked up by dewatering belt 56 and fed from there into screw press 58 adapted to express any remaining excess water from the plastic flakes. As will be discussed in greater detail below, screw press 58 assists in isolating the aqueous solution recirculating through dip tank 46 and wash tank 54 from downstream tanks such as wash tank 72, and thereby reduces the carryover of fine contaminants that otherwise tend to increase turbidity in and overload the filtering systems of the downstream tanks.

According to one embodiment of the invention, wash tank 54 is a preferred site for injecting wash chemicals into the recirculating aqueous solution used as a diluent, wetting agent and settling medium for removing contaminants from polymeric film. Such wash chemicals can include, for example, one or more surfactants, degreasers (particularly when processing "blue bags"), flocculants, pH adjusters, and the like. It has been discovered that traditional detergents that create sudsing and foam are detrimental to cleaning the film flake as they tend to float the contaminants to the surface and thereby counteract separation from the film. A preferred polyethylene thin-gauge cleaning solution is therefore a surfactant-like product that has emulsifying and degreasing capabilities along with de-inking and solubilizing properties and sequestering capabilities. One preferred additive for use in system 10 that can be introduced into dip tank 46 and/or wash tank 54 is Plasdet, a granular plastic cleaner marketed by Dober Group of Midlothian, Ill., which is particularly useful for emulsifying paper labels and for cutting grease from post-consumer film. Plasdet cleaner is desirably used at an application rate of about 150 ml/min when pre-diluted at about 1 oz. per gallon. Hot water can also be added to wash tank 54 if desired to assist in cleaning film having significant amounts of ink or glue associated with it.

Film flakes discharged from screw press 58 desirably fall into catch basin 60, where they are picked up in another recirculating aqueous solution by pump 70 and slurried into wash tank 72. At the distal end of wash tank 72, the flakes of film are preferably picked up by dewatering belt 74 and fed from there into screw press 76 adapted to express any remaining excess water from the plastic flakes. Material discharged from screw presses 58, 76 will preferably comprise from about 60% to about 70% solids, although use of a heavy duty press such as a Dupps® press may produce an effluent consisting of from about 90% to about 95% solids. For the throughput rates described herein, screw presses having about a 16 inch screw and a mesh or screen size of about ⅛ inch are preferred.

Film flakes discharged from screw press 76 desirably fall into catch basin 78, where they are picked up in another recirculating aqueous solution by pump 80 and slurried into rinse tank 82. As depicted in FIG. 1, rinse tank 82 has a longitudinally extending vertical baffle 84 that creates a U-shaped flow configuration. Rinse tank 82 also preferably has inclined walls in the lower portion of the tank that assist in directing settled particulate matter toward one of the plurality of spaced-apart removal ports 86. The slurry containing the film flakes is preferably injected beneath the surface of the recirculating liquid in rinse tank 82 in a manner similar to that previously described in relation to wash tank 72. The rinsed film flakes are collected from rinse tank 82 by dewatering belt 88 and fed into screw press 90 that expresses any excess liquid.

According to one particularly preferred embodiment of the invention, rinse tank 72 is a principal site for introducing into the recirculating liquid a flocculant intended to remove fine suspended particles from the rinse water, thereby minimizing contaminant carryover into the final product.

Three particularly preferred additives for use in flocculating fine suspended contaminants such as paper particles according to the method of the invention are MDA 65, MDA 66 and MDA 819A (modified Polylink 819), proprietary products marketed by Matrix Design of Spring, Tex. According to Matrix Design literature, MDA 65 is generally described as a catalyst that is a combination of several proteins and multiple complex enzymes, buffered with select carbohydrates. MDA 66 is generally described as a material created to enhance more total removal-control of the constituents in a waste water stream, containing charged solids that distribute themselves on the surface of each sheet of protein. These charged solids agglomerate the charged constituents in proximity to the protein sheets. MDA 819A is generally described as a modified natural protein chain that manipulates the sheer forces involved in the differential surface tension that holds the contaminants in suspension. MDA 66 is said to couple with MDA 65 to create a more intensive sheeting action between protein sheets and a waste water stream. Protein polymer reactions are described as a "sheeting action" as opposed to polar attraction experienced in organic polymer chemistry, where cationic and anionic charges are arranged and designed to allow for prescribed removal of waste water stream constituents. In protein polymer reactions, sheets of protein are said to be "laid down" in organized fashion throughout the waste water stream. These sheets are said to interfere with the assumed surface tension fo the constitutents in the waste water. This "interference" becomes a differential surface tension-breaking mechanism between the carrier solution and the foreign contaminants contained within the stream. Concurrent introduction of MDA 65 and MDA 66 is said to cause a rapid reaction in which the captured charged components are broken up into succinct whole parts (nodules) by the tension breaking reaction of the protein. The resultant constituents are then moved to the surface, or bottom, determined by their total specific gravity as related to the carrier solution. According to this particularly preferred embodiment of the invention, MDA 65 at a 12% concentration is diluted at a 1:1 ratio with water prior to addition to the recirculating liquid in the recirculation modules as described above. Similarly, MDA 66 at a 6% concentration is diluted at a 1:3 ratio with water prior to addition to the recirculating liquid in the recirculation modules. MDA 819A at a 3% concentration is diluted at a 1:5 ratio with water prior to addition to the recirculating liquid in the recirculation modules. Dilution of these components with water in the stated ratios is conveniently done in independent drums equipped with mixers and metering pumps well known to those of ordinary skill in the art.

Figure 10:
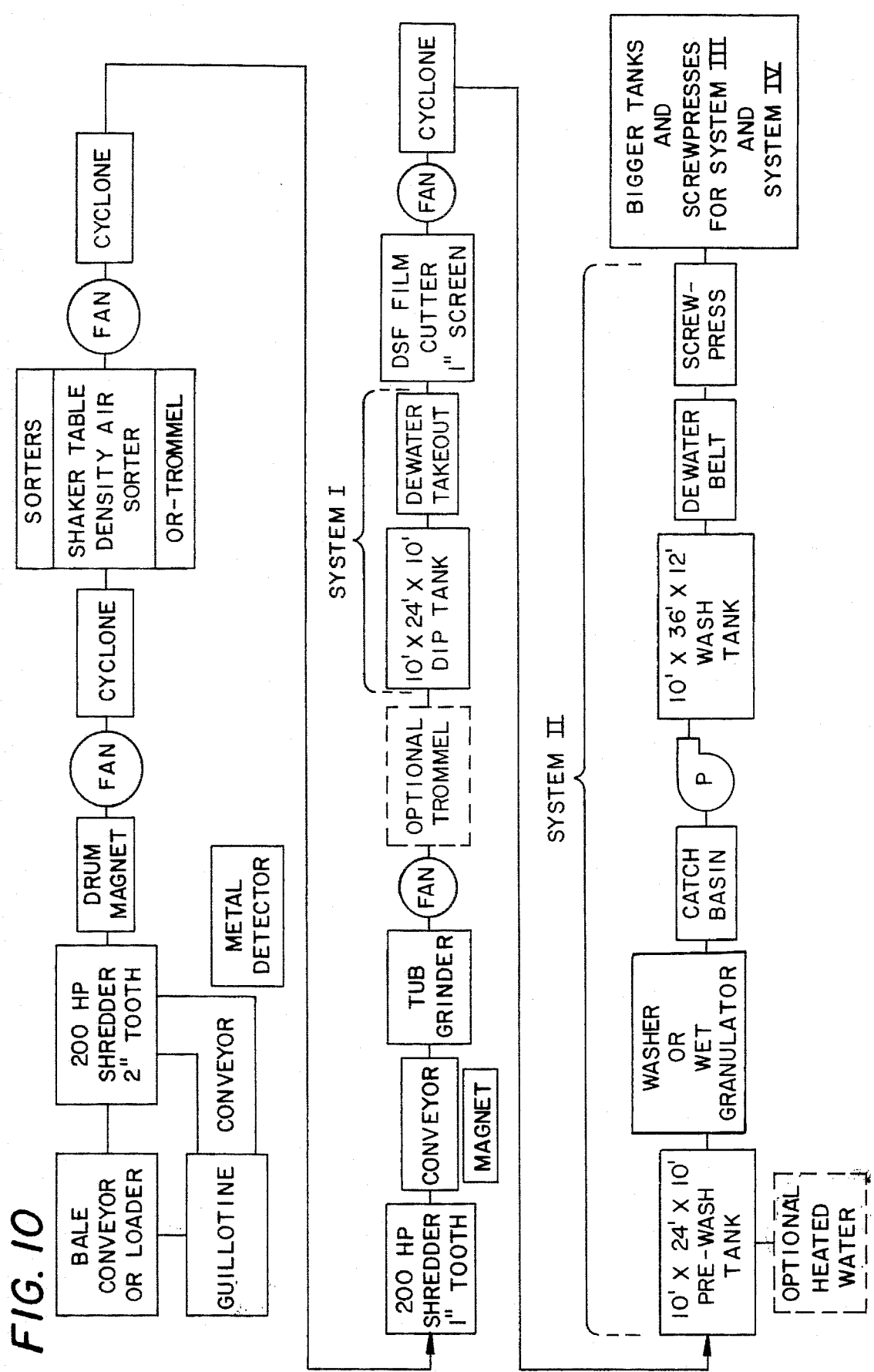
FIG. 10 is a simplified process flow diagram depicting an alternate preferred contaminant removal system for use in reclaiming post-consumer, thin-gauge plastic film.

A simplified diagrammatic representation of a manifold 176 useful for introducing additives into rinse tank 72 of the invention is shown in FIG. 10. According to a preferred embodiment of the method of the invention, desirable results are achieved for film throughputs as described herein wherein the dilute solutions of MDA 65, MDA 66, MDA 819A and/or such other additives as may be desired are introduced into rinse tank 72 through ports 174 of manifold 176. Representative rates of addition of MDA 65, MDA 66 and MDA 819A are about 100 ml/min, 150 ml/min and 100 ml/min, respectively, where the recirculation rate is about 500 to about 600 gallons of water per minute.

The washed and rinsed film flakes are then dried to remove remaining moisture to the extent required for storage or for further downstream processing not shown in FIG. 1. Such downstream processing can include, for example, the formation of rolled, densified pellets or extrusion (optionally through a screenpack) to form conventional extruded pellets of the reclaimed plastic.

According to one embodiment of the invention, the flake is blown via an air system and dried in a modified Jet Pro grain dryer to a moisture content of less than about one percent. From the dryer, the flake is transferred via an air system and dropped through a cyclone into a holding bin which is vaccuum controlled and injected with ionized air. Resultant fine paper particles are then pulled off and removed through a bag house filter.

The resultant flake is then rolled into pellets, cooled and transferred into boxes or bulk for storage. The rolled pellets can then either be combined in their present state at approximately 20 to 22 pounds per cubic foot with virgin resin via proper metering and feed equipment and compounded and extruded into the finished film product, or compounded, melt-filtered through a screen pack and extruded through a devolatilizing extruder back into plastic pellets comprising approximately 38 lbs. per cubic foot for use by itself or in conjunction with virgin pellets into finished film products. It has been found that with certain recycled plastics such as post-consumer plastic grocery sacks, that printing and the resultant inks used, require that the material be devolatilized prior to extruding for use in higher levels of recycle content above 10% to prevent lensing and gels due to volatiles in the recycled film. It has also been found that excessive contamination in the rolled pellets can require additional melt filtration through a screen pack with a 100–180 mesh screen to eliminate excessive gels (due to contamination) in the final product. Therefore, quality and economic considerations will determine the resultant type of pellet used to produce the resulting end-product required for the application.

The method of the invention depends upon subjecting the post-consumer film and intermixed lightweight contaminants such as paper particles to thorough wetting as the film passes through successive tanks or receptacles such as those described above. Although the liquid that is recirculated through each of the recirculation modules is an aqueous solution consisting primarily of water, particularly desirable results are achieved by the addition of comparatively minor amounts of preferred additives such as, for example, surface tension modifiers, flocculants, pH adjusters, and the like.

A significant feature of system 10 of the invention is the use of independent recirculation modules for more completely, consistently and efficiently removing suspended particulate matter, particularly fine paper particles, at as early a stage as possible within the system. In the past, the use of a single system for recirculating and filtering the aqueous liquid utilized in the dip, wash and rinse tanks presented difficulties because fine particulate matter tended to build up within the system as the liquid moved through successive tanks. Then, when the turbid liquid was eventually filtered, the suspended particle content was so high that filters designed for use in removing particles of that size would quickly become overloaded and plugged.

In the present invention, the difficulties previously encountered have been overcome by partitioning the recirculating liquid into a plurality of independent recirculation modules, each having its own pumps and filtration means. By partitioning the recirculating liquid into independent modules, it is now possible to independently adjust the chemical composition and properties of the aqueous solution in each module by injecting additives such as surfactants, buffers, and the like to better control surface tension, pH, etc. of the liquid. Additionally, it is also now possible to control turbidity more effectively by injecting flocculant into the liquid within a specific recirculation module whenever the turbidity in that module exceeds a desired level. Different amounts and/or kinds of flocculants can be used depending upon the contaminant load experienced within each module. A particularly preferred embodiment of the invention utilizes means for either periodically or continuously monitoring the turbidity and/or other properties within each recirculation module and for intermittently injecting a desired flocculant or other additive into the liquid in response to the monitored values. Screw presses or other similarly effective means are desirably used in the system and method of the invention for reducing the amount of liquid carried over with the plastic film from one recirculation module to another.

It is emphasized that the particular number and arrangement of dip, wash or rinse tanks and the number of independent liquid recirculation modules used in the system and method of the invention to decontaminate thin-gauge plastic film is not limited to those depicted and described in the preferred embodiments although, for example, the embodiment described herein in relation to FIGS. 1–9 is known to produce reclaimed film of high quality that is suitable for use in film-grade applications.

Figure 2:
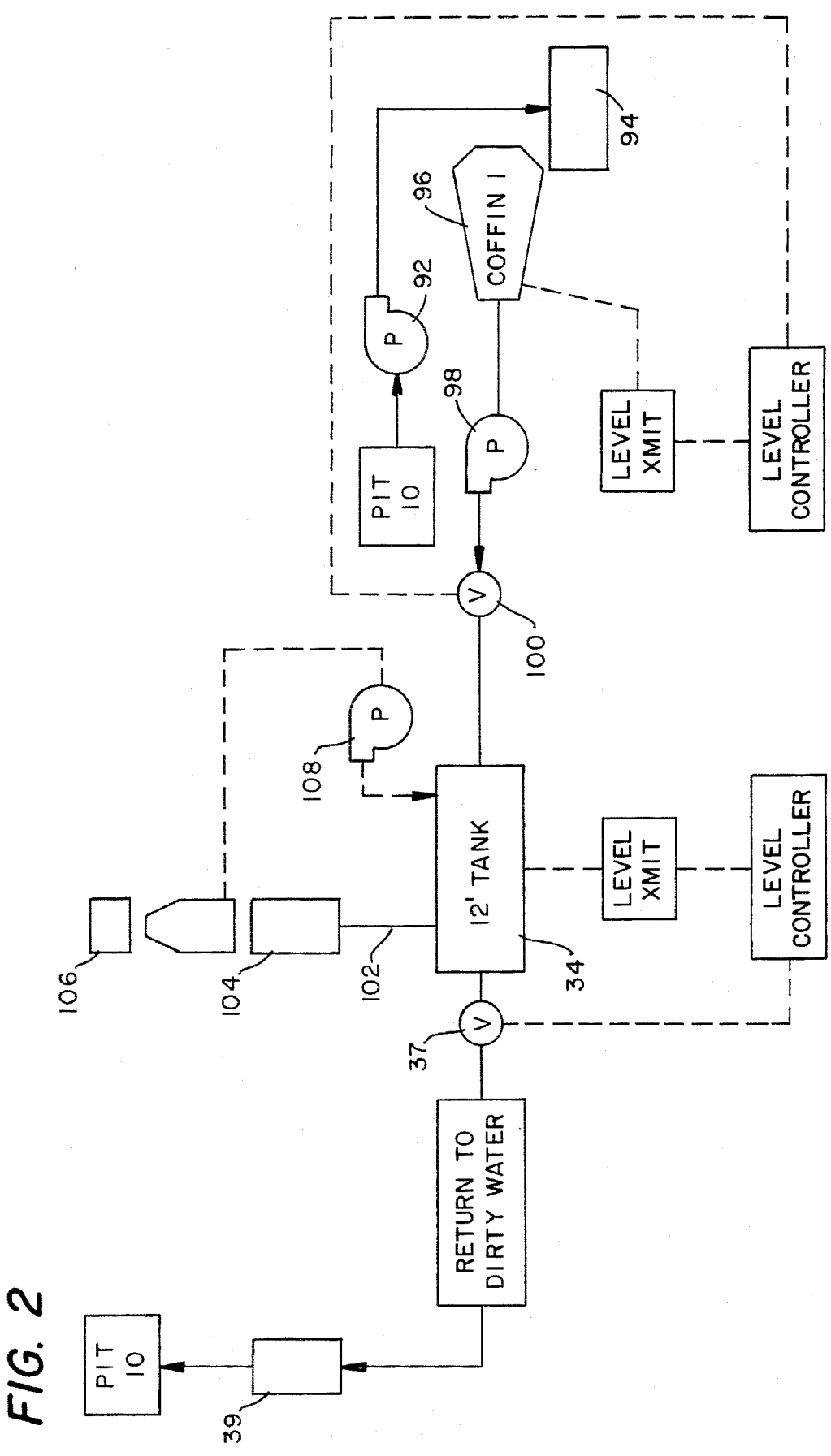
FIG. 2 is a process flow diagram depicting the diluent flow system identified as System I in FIG. 1.

Referring again to FIG. 1, the dashed line labeled as "System I" designates a liquid recirculation module that recirculates and filters the aqueous solution supplied to dip tank 34. System I is further described and explained in relation to FIG. 2. Referring to FIG. 2, liquid is withdrawn from dip tank 34 through dewatering belt 36 (combined with liquid recovered from dewatering belt 40) and through valve 37, which is desirably installed so as to maintain a desired liquid level in tank 34. The recovered liquid is preferably routed through screener belt 39 (e.g., 300 microns) to a settling receptacle (not shown, but identified as "Pit 10" in FIG. 2). Tank 34 is supplied with recirculated liquid by pump 98 through control valve 100. Pump 98 draws water from coffin 96. Water drawn from the settling pit by pump 92 is filtered by means such as filter 94 to remove fine contaminants before being discharged into coffin 96. Although not shown in FIG. 2, it will be apparent that make-up water can be added as needed to maintain the desired circulation rate through tank 34. Contaminants recovered from the bottom of tank 34 are desirably dewatered by means such as dewatering belt 104, and the recovered solids are disposed of, for example, in waste receptacle 106 while the recovered liquid is returned to tank 34 by pump 108. Tank 34 and the other dip, wash or rinse tanks in the system of the invention are desirably provided with cycling automatic valves to periodically withdraw contaminants through the takeout ports located in the tank bottoms.

Figure 3:
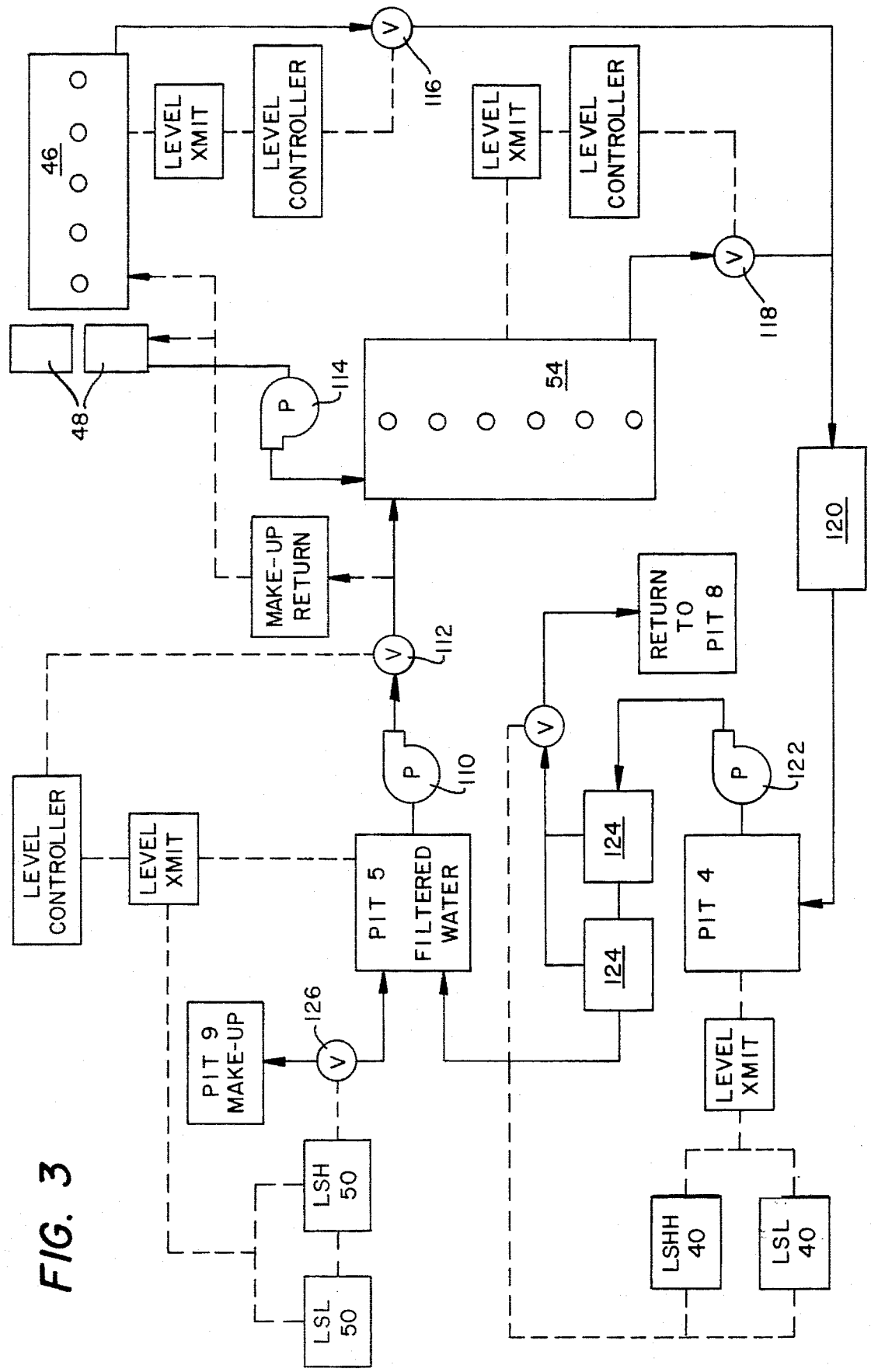
FIG. 3 is a process flow diagram depicting the diluent flow system identified as System II in FIG. 1.

Referring again to FIG. 1, the dashed line labeled as "System II" designates a liquid recirculation module that recirculates and filters the aqueous solution supplied to dip tank 46 and wash tank 54. System II is further described and explained in relation to FIG. 3. Referring to FIG. 3, the fresh recirculating liquid is supplied to dip tank 46 and to wash tank 54 by pump 110 through control valve 112. Pump 110 also supplies aqueous solution to wet granulator means 48. Dirty liquid is withdrawn from dip tank 46 and wash tank 54 through control valves 116, 118, respectively, which also provide level control for the two tanks. The effluent withdrawn from the tanks is desirably passed through screener belt 120 (300 microns) to remove larger contaminants and is then discharged into a settling receptacle (identified as "Pit 4" in FIG. 3), which is shown as a pit, but can also be a plastic tank, for example, and is most preferably equipped with means for conveniently removing accumulated contaminants that settle to the bottom. From the settling pit, the effluent is preferably pumped by pump 122 through filter means such as filters 124 (e.g., about 325 mesh) and then into a filtered liquid holding receptacle such as "Pit 5" shown in FIG. 3. Means such as control valve 126 are also preferably provided to admit make-up water to System II whenever needed.

Figure 4:
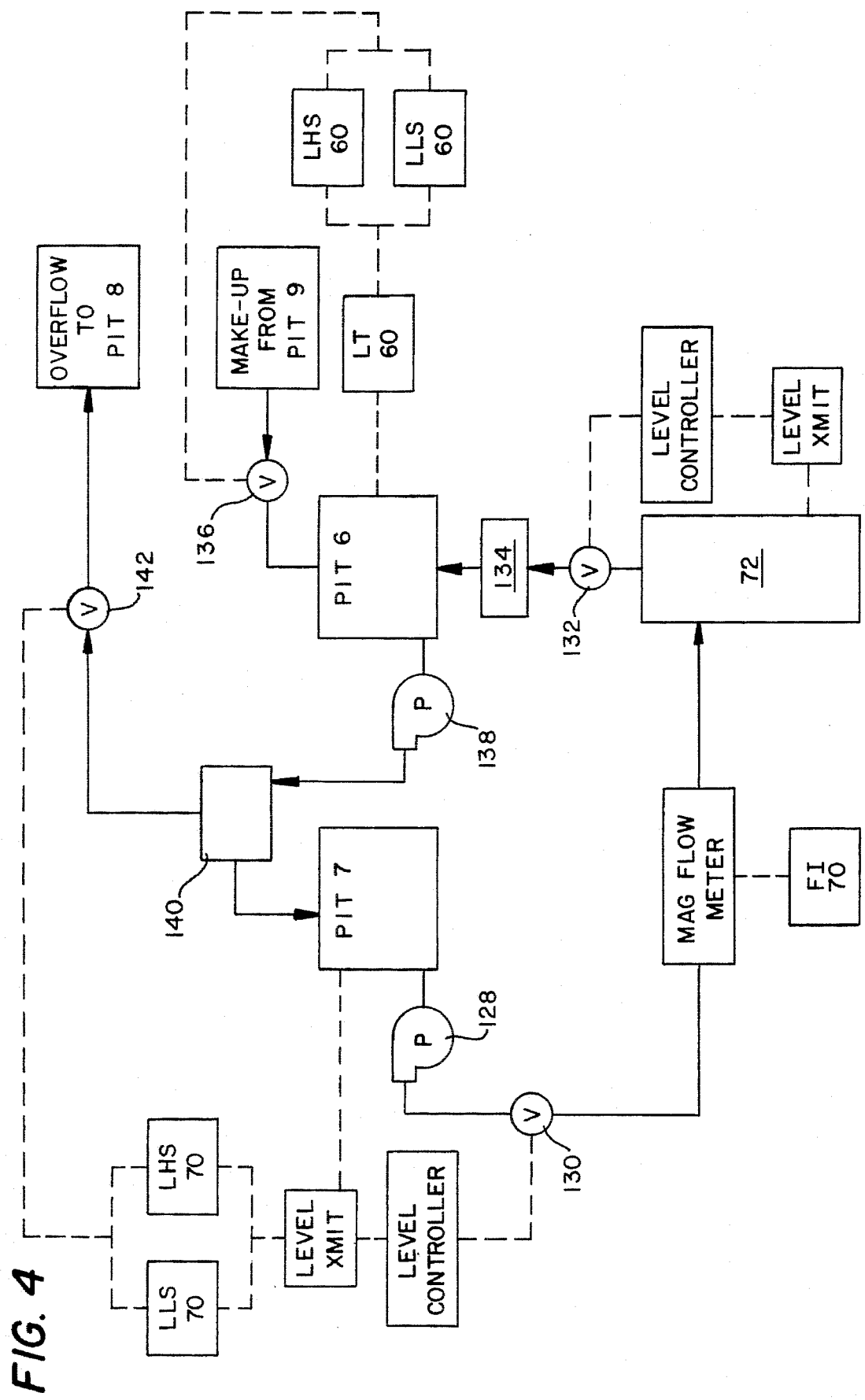
FIG. 4 is a process flow diagram depicting the diluent flow system identified as System III in FIG. 1.

Referring again to FIG. 1, the dashed line labeled as "System III" designates a liquid recirculation module that recirculates and filters the aqueous solution supplied to wash tank 72. System III is further described and explained in relation to FIG. 4. Referring to FIG. 4, the fresh recirculating liquid is supplied to wash tank 72 by pump 128 through control valve 130. Dirty liquid is withdrawn from wash tank 72 through control valve 132, which also provides level control for the tank. The effluent withdrawn from tank 72 is desirably passed through screener belt 134 (e.g., 300 microns) to remove larger contaminants and is then discharged into a settling receptacle (identified as "Pit 6" in FIG. 4), which is shown as a pit, but can also be a plastic tank, for example, and is most preferably equipped with means for conveniently removing accumulated contaminants that settle to the bottom. From the settling pit, the effluent is preferably pumped by pump 138 through filter means such as filter 140 (e.g., about 500 mesh) and then into a filtered liquid holding receptacle such as "Pit 7" shown in FIG. 4. Means such as control valve 142 are also preferably provided to admit make-up water to System III whenever needed.

Figure 5:
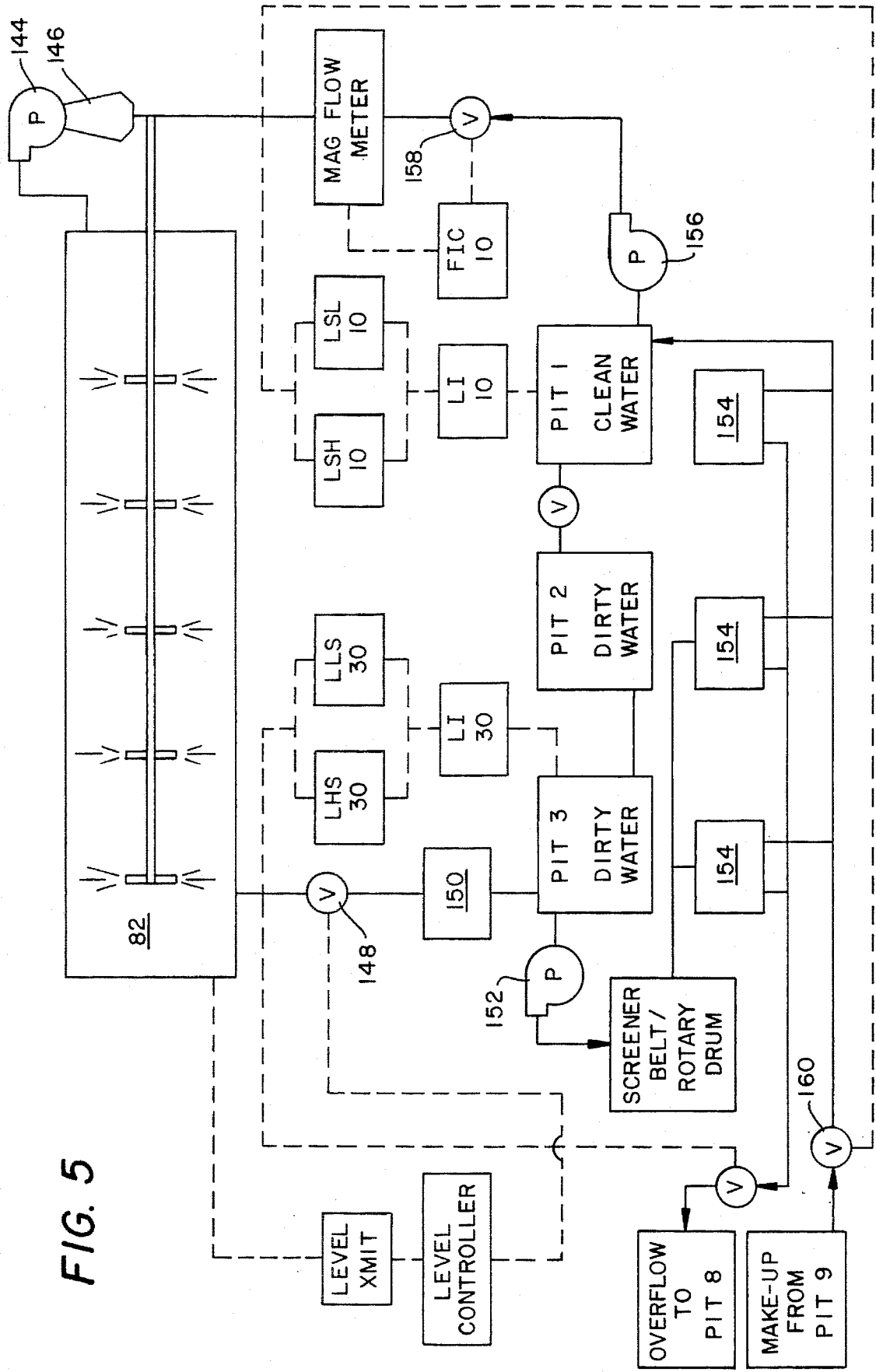
FIG. 5 is a process flow diagram depicting the diluent flow system identified as System IV in FIG. 1.

System IV designates a liquid recirculation module that recirculates and filters the aqueous solution supplied to rinse tank 82. System IV is further described and explained in relation to FIG. 5. Referring to FIG. 5, clean recirculating liquid is supplied to rinse tank 82 by pump 144 from coffin 146. Dirty liquid is withdrawn from rinse tank 82 through control valve 148, which also provides level control for the tank. The effluent withdrawn from tank 82 is desirably passed through screener belt 150 (e.g., 300 microns) to remove larger contaminants and is then discharged into a settling receptacle (identified as "Pit 3" in FIG. 5, with overflow capacity in "Pit 2"), which is shown as a pit, but can also be a plastic tank, for example, and is most preferably equipped with means for conveniently removing accumulated contaminants that settle to the bottom. From the settling receptacle, the effluent is preferably pumped by pump 152 through filter means such as filters 154 (e.g., about 500 mesh) and then into a filtered liquid holding receptacle such as "Pit 1" shown in FIG. 5. Means such as control valve 160 are preferably provided to admit make-up water to System IV whenever needed. From the filtered liquid holding receptacle ("Pit 1"), clean liquid is returned to coffin 146 by pump 156 through control valve 158.

Figure 6:
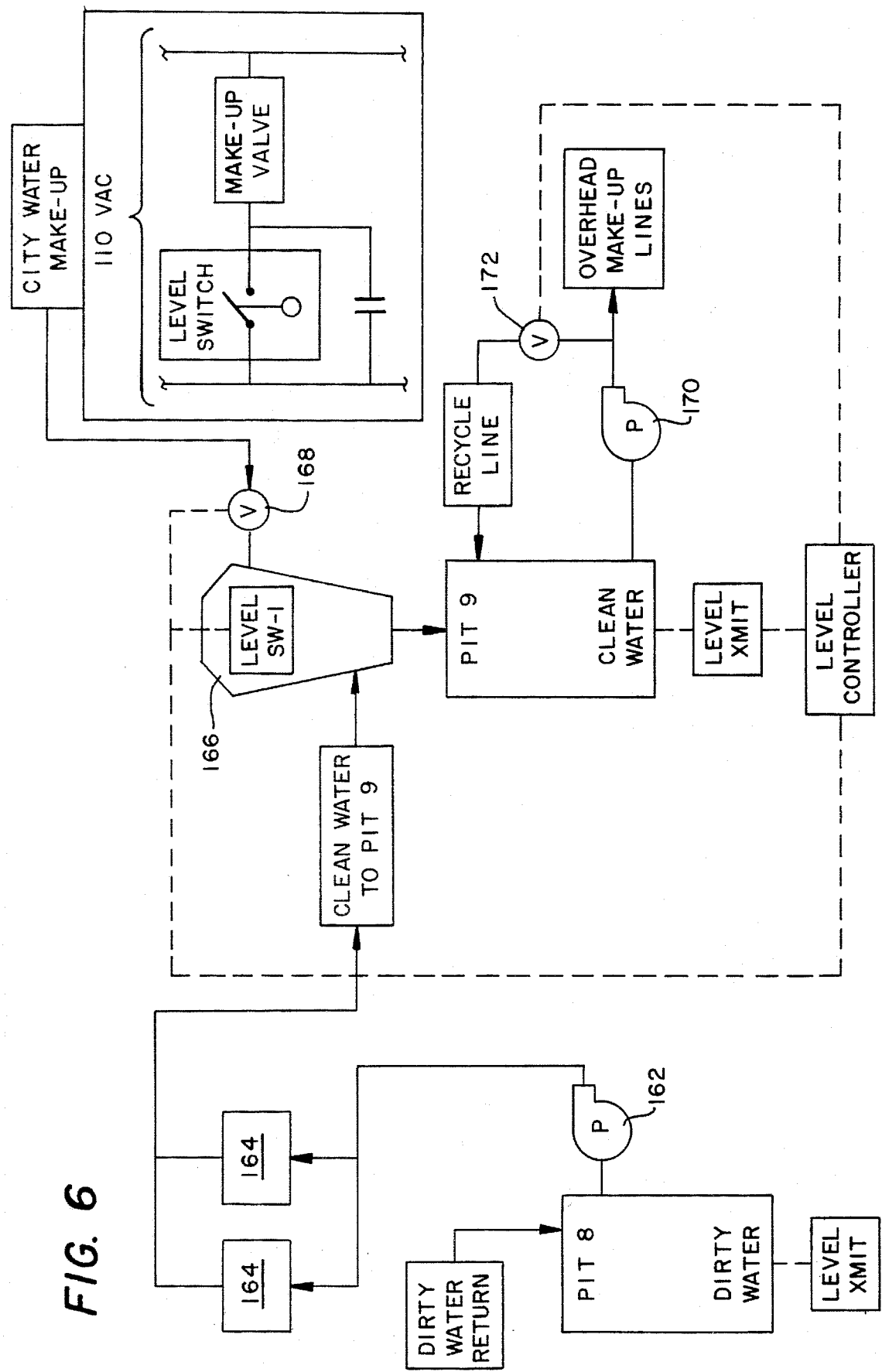
FIG. 6 is a process flow diagram depicting a preferred clean water make-up system for use with the method and apparatus of the invention.

FIG. 6 is a process flow diagram depicting a preferred clean water makeup system for use with the system and method of the invention. Referring to FIG. 6, overflow dirty water from a receptacle such as Pit 8 is pumped by pump 162 through filter means such as filters 164 and then discharged into a receptacle such as Pit 9. Level switch 166 cooperates with control valves 168 and 172 to maintain the available clean water in Pit 9 at a desired level. Whenever the level in Pit 9 drops below a predetermined minimum, valve 168 is opened to admit make-up water from an external source.

Figure 7:
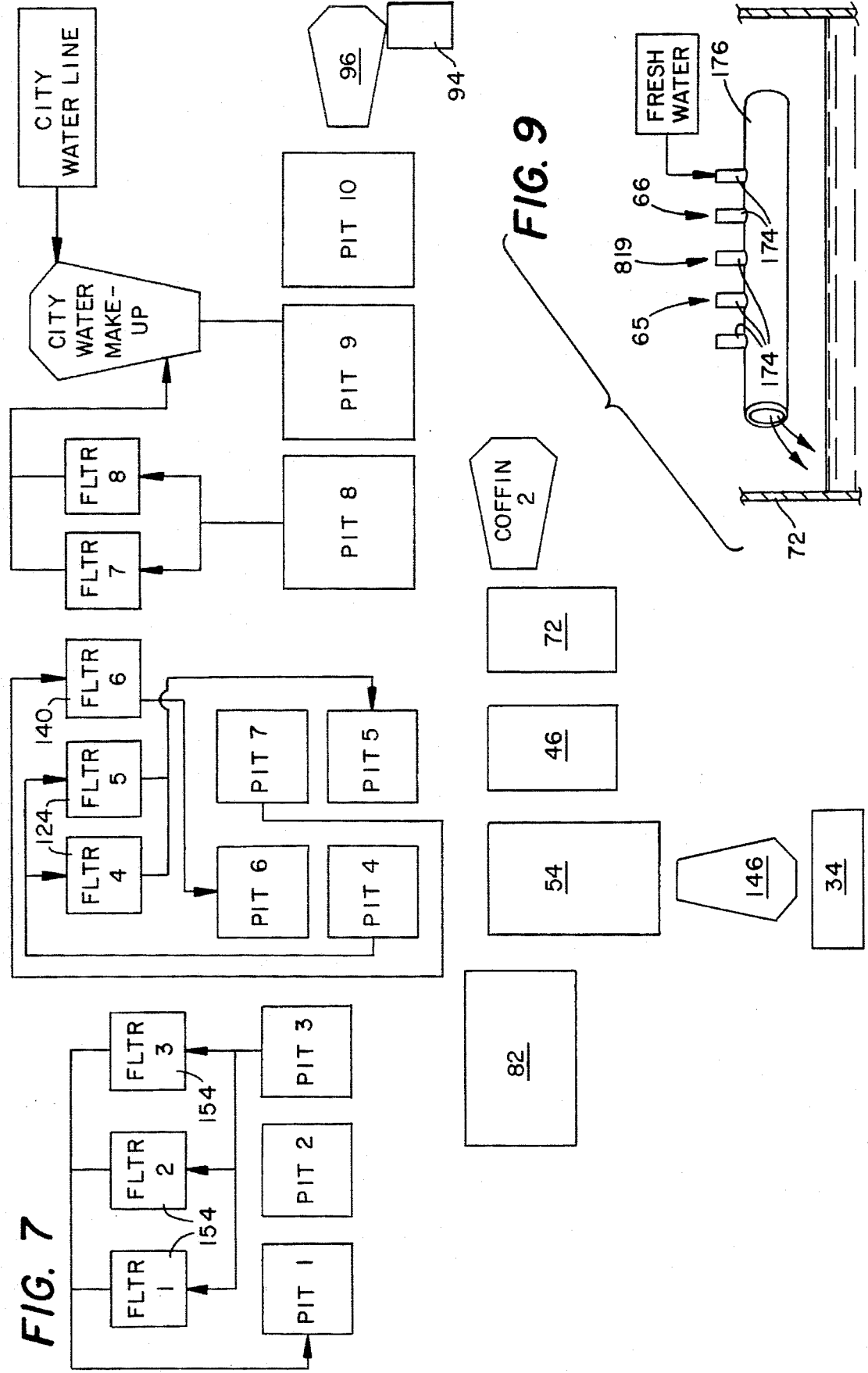
FIG. 7 is a plan view depicting a preferred equipment layout for use with the system of the invention.

FIG. 7 is a plan view depicting a preferred equipment layout for use with the system and method of the invention as described in relation to FIGS. 1–6, although it will be appreciated by those of ordinary skill in the art upon reading this disclosure that other equipment layouts can also be used within the scope of the present invention. FIG. 8 is a diagrammatic front elevation view of an exemplary control panel for use with the apparatus depicted in FIGS. 1–7.

When system 10 is used as described herein, the recirculated liquid in Systems I, II and III is preferably dumped and replaced weekly, and the recirculated liquid in System IV is preferably dumped and replaced bi-weekly. It is believed, however, that such periodic replacement can be avoided with the use of a sidestream batch filtration system or other similarly effective means. Through use of the system and method disclosed herein, all contaminant particles greater than about 3 microns, and most prefably, all contaminant particles greater than about 1 micron are desirably removed from the reclaimed film particles. Larger contaminant particles tend to produce undesirable gels when the reclaimed plastic is reused in producing thin-gauge plastic film. Similarly, the removal of ink is also desirable because volatile materials present in the ink can cause voids when the reclaimed is reused in film applications.

It has been determined that monitored water quality in the recirculation modules correlates directly to finished film quality and that turbidity readings of the water can be correlated directly to contaminants in the flake. Therefore, the surfactant and flocculant injections into the various modules can be monitored and controlled according to the observed turbidity levels. It is envisioned that in the future, all injection of solutions and maintenance of system concentrations will be controlled by on-line continuous turbidity sensors, strategically located in the separation vessels and continuously controlled via a computer process control system. It is further envisioned that a continuous in-line laser particle distribution analyzer combined with a process control computer program will constantly monitor the contamination level of the exiting film flake and correlate quality via lot numbers of subsequent pelletized plastic product. The laser particle distribution counter can be programmed to count the number of particles at a specified range of sizes. It can take a series of tests within a very short time and give an average to be used per data point of the largest and smallest particle. The largest particle per stage within the processing system is what would be monitored in-line, which would be much more specific and controllable than a turbidimeter. A turbidimeter would measure overall turbidity, whereas the particle counter would only measure the size and number of the contaminant affecting the quality of the end product.

Referring to FIG. 10, an alternate equipment layout is provided that can be used in accordance with the method of the invention in place of the apparatus described above for processing post-consumer plastic film from bale-breaking through Systems I and II.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

We claim:

1. A system for removing paper and other contaminants from shredded plastic film, the system comprising a plurality of receptacles, means for moving the plastic film sequentially through the receptacles, means for recirculating aqueous solution through each of the receptacles, and means for filtering the recirculated aqueous solution, said recirculating and filtering means comprising at least two independent recirculation modules, each recirculation module having means for recirculating and filtering an aqueous solution and for restricting carryover of solution between modules, at least one recirculation module having means for introducing flocculant into the solution in response to measured or observed turbidity.

2. The system of claim 1 wherein said means for introducing flocculant comprises means for monitoring the turbidity of the recirculating aqueous solution and means for intermittently injecting flocculant into the recirculating solution whenever the turbidity exceeds a predetermined value.

3. The system of claim 2, wherein the means for monitoring the turbidity of the recirculating aqueous solution comprises a turbidity meter.

4. The system of claim 3, wherein the turbidity meter is an in-line laser particle distribution analyzer.

5. The system of claim 1, wherein the means for restricting carry-over of solution between modules includes a screw press.

6. The system of claim 1, further comprising means for introducing a surfactant into the recirculating solution.

7. The system of claim 1, wherein the independent recirculation modules are closed-loop circulation systems.

* * * * *